Oct. 28, 1958 L. E. BROWNELL ET AL 2,858,079
MACHINE FOR PULPING SUGAR BEETS
Original Filed Dec. 17, 1954
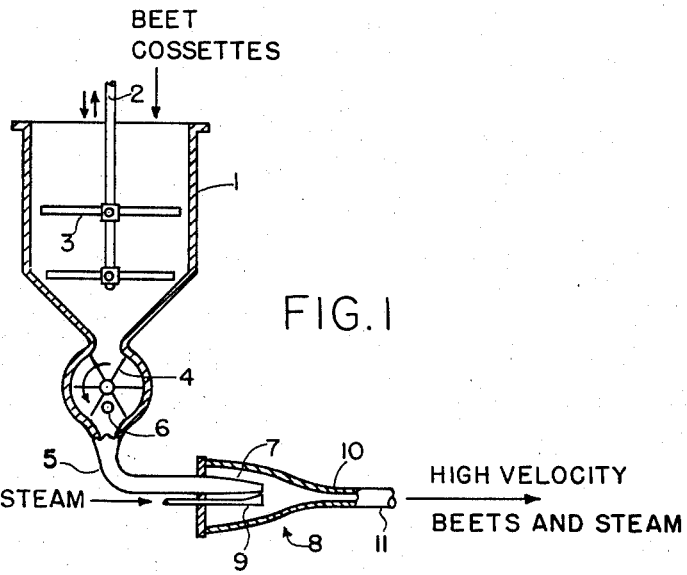
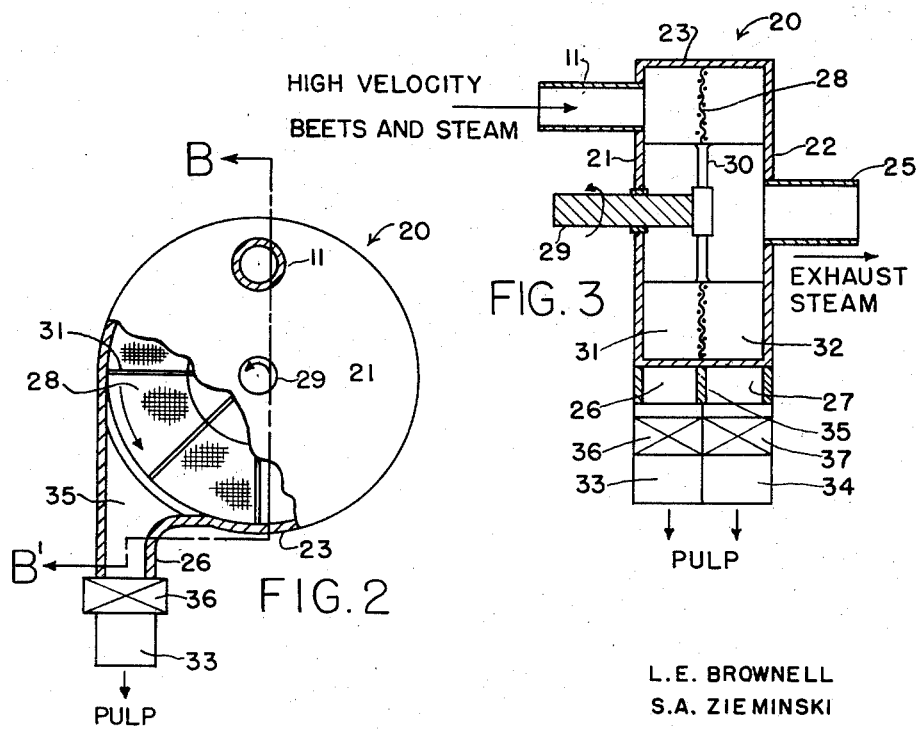
L.E. BROWNELL
S.A. ZIEMINSKI
INVENTORS
BY R. Hoffman
W. Pier
ATTORNEYS

2,858,079
MACHINE FOR PULPING SUGAR BEETS

Lloyd E. Brownell, Ann Arbor, Mich., and Stefan A. Zieminski, Orono, Maine, assignors to the United States of America as represented by the Secretary of Agriculture Original application December 17, 1954, Serial No. 476,098, now Patent No. 2,818,358, dated December 31, 1957. Divided and this application June 6, 1957, Serial No. 669,392

1 Claim. (Cl. 241—39)

This application is a division of our application Ser. No. 476,098, filed Dec. 17, 1954, now Patent No. 2,818,358, dated Dec. 31, 1957, which in turn is a continuation-in-part of our application Serial No. 386,141, filed Oct. 14, 1953, now Patent No. 2,807,560, dated Sept. 24, 1957.

This invention relates to sugar beets and has among its objects the provision of apparatus for treating sugar beets according to the process described and claimed in said application, Serial No. 476,098, filed December 17, 1954, whereby to facilitate recovery of sugar-bearing juice from the beets. A particular object of the invention is the provision of apparatus for use in the process in which the cell walls of sugar beets are ruptured by applying a sudden change of momentum to a stream of beet pieces moving at high velocity. By rupturing the cell walls the sugar-bearing juice is released from its natural sites and is easily separated from residual solids as by centrifugation, pressing, filtration, etc. Another particular object of the invention is the provision of apparatus, adapted for continuous operation in the process, wherein the above-mentioned change in momentum is effectuated by causing the rapidly moving beet pieces to impinge on a barrier. Further objects and advantages of the invention will be apparent from the description herein and the annexed drawing.

The drawing annexed hereto illustrates apparatus within the purview of this invention. In the drawing:

Fig. 1 is an elevation, partly in cross-section, of the feeder and ejector components.

Figs. 2 and 3 illustrate the disintegrator and separator apparatus; Fig. 2 is an elevation partly in cross-section whereas Fig. 3 is a cross-section taken on planes B—B' of Fig. 2.

The production of sugar from sugar beets is a well-established industry in this country and abroad. One of the major problems in this industry concerns the initial preparation of the sugar-bearing juice from the beets. The current technique for obtaining the juice is known as diffusion and involves cutting the beets into strips, called cossettes, then treating the cossettes in a batch or continuous diffuser with hot water. One widely used type of continuous diffuser consists of a series of about twenty-one U-shaped cells, each approximately 2 ft. wide and 12 ft. deep. Each cell is set several inches higher than its predecessor so that the juice may flow by gravity through the cells. The cossettes are fed into the diffuser at one end of the lower tier and are carried by drag chains equipped with perforated steel-plate flights from one cell to the other through the entire length of the diffuser and finally discharged at the other end. The important point about diffusion is that it, as the name implies, is dependent on the diffusion of juice from the cells within the cossettes into the aqueous phase surrounding the cossettes. Since this diffusion through the cellular material is relatively slow, this method of obtaining the juice involves a long processing time and the equipment is bulky and occupies a large part of the floor space of the factory. Although the disadvantages of diffusion are well known and much experimentation has been done to devise methods to recover the juice by other techniques, no widely used successful alternative has heretofore been advanced.

It has now been found that the necessity for diffusion can be eliminated by a novel treatment of the sugar beets. In essence, this treatment involves accelerating beet pieces to a high velocity and then applying a sudden change of momentum to the rapidly moving beet pieces. The sudden change of momentum may be accomplished by causing a stream of the beet pieces moving at high velocity to impinge on a barrier. The result of such action is that the beet pieces are instantaneously disintegrated forming a pulp. This disintegration is desirable as the cell walls in the beet tissue are ruptured and the beet juice is easy to separate from residual solids. Thus the juice can be recovered from the pump by pressing, centrifugation, filtration or leaching with water. Since the cell walls are ruptured, the sugar-bearing juice can flow freely out of the tissue, the movement of the juice being no longer limited by the physical process of diffusion through cell walls and other intact tissue.

By proceeding in accordance with this invention, the disintegration is essentially complete and uniform. That is, essentially every cell in the beet pieces is opened and the juice content of every cell thus released. The reason for such uniform action lies in the physical forces created by the abrupt change in momentum. This situation can be explained as follows: consider a single piece of beet moving at high speed and then suddenly striking a barrier so that it is abruptly stopped in its tracks. As the piece ceases to move, the liquid content of each cell will surge forward with great force due to the effect of momentum with the result that the cell walls will be stretched and finally ruptured.

An important feature of this invention is that the treatment does not adversely affect the quality of juice recovered from the beets. Experimental investigations have shown that the quality of the raw juice obtained from the beet pulp is not significantly lower than the quality of the juice obtained by the diffusion process. In particular, it has been observed that the proportion of invert sugar, pectin, and nitrogenous components is not significantly greater in the raw juice from beet pulp than in diffusion juice. In some cases it has been observed that the juice obtained by the process of this invention is better in quality, particularly after the usual purification, than the comparable purified juice from the diffusion process. The fact that the juice obtained in accordance with this process equals or exceeds the quality of diffusion juice is surprising indeed when it is considered that the impingement of the fast moving beet pieces in accordance with this invention causes disintegration of the beet pieces and it would be expected that this disintegration would cause the juice to contain excessive amounts of high molecular weight compounds such as pectins and proteins which in the usual diffusion procedure would remain in the tissue because they would not diffuse through the intact cell walls.

Another feature of the invention is that it is particularly adapted for continuous operation. The advantages of continuous operation includes reduction in retention time of the beets being processed, savings in labor and steam, dilution of the pulp with condensed steam is lessened and equipment of relatively small size can be used to process large amounts of beets.

Application of this invention is described in more detail, as follows:

Sugar beets are washed and preferably trimmed to remove the crown and root portions. The beets are then cut into pieces, such as dice, slices or strips such as cossettes as common in the industry.

The next step is to establish a stream of beet pieces moving at a high velocity, that is, a velocity greater than about 50 ft./sec. In general a velocity around 200–300 ft./sec. is preferred. The acceleration to such velocity can be accomplished in many ways. For example, the raw beet pieces may be dropped onto a rapidly spinning vaned disc thus to be impelled away from the center of the disc at high velocity by centrifugal force. Another technique involves placing the beet pieces in a closed chamber equipped with a conical bottom which tapers to an outlet pipe. The beet pieces are are then subjected to a sudden burst of high pressure steam, air, or other gaseous medium. By this means the beet pieces are exploded out of the outlet pipe at high velocity. This explosion technique is described in detail in our prior patent No. 2,807,560 referred to above. The preferred technique however involves establishing a high velocity stream of a gaseous medium such as air, steam, or mixtures of air and steam, moving in a confined linear path at a velocity of at least about 200 feet per second. The sugar beet pieces, in a raw unheated state, are fed at a pre-determined rate into the gaseous medium whereby the beet pieces are accelerated to a velocity approaching that of the stream. The stream of gaseous medium and beet pieces are thereafter directed against a barrier whereby the stream impinges on the barrier, the resulting beet pulp is separated from the gaseous medium, and the juice thereafter separated from the pulp. In the above procedure, it is preferred that the gaseous medium be steam and that the time of contact between the steam and beet pieces be less than one second so that the beet pieces at the moment of impingement are in an essentially raw, uncooked, and firm condition. A convenient method of feeding the beet pieces into the stream is by use of an ejector, that is, the stream of gaseous medium is forced through a nozzle and the beet pieces are introduced into the stream at the point where the increased velocity of the moving gaseous medium passing through the nozzle creates an area of decreased pressure.

The last-named means of accelerating the beet pieces, that is, by feeding them into a high-velocity stream of gaseous medium, is preferred because of several advantages, as follows:

(a) The procedure permits continuous operation which results in saving in labor, equipment cost and processing time.

(b) The beet pieces can be accelerated to very high velocities with simple and relatively inexpensive apparatus. For example, except for the piping of the moving gaseous medium and a nozzle for converting the medium's pressure into kinetic energy, no pressure resistant equipment is required.

(c) The beet pieces are each accelerated to the same velocity with the result that disintegration is uniform throughout.

(d) The velocity of the pieces can be instantly controlled by adjustment of the velocity of the moving gaseous medium.

(e) The beet pieces are accelerated to a high velocity so rapidly that even if steam is used as the moving gaseous medium only a minor degree of heating of the pieces occurs. This is an important advantage in two ways. In the first place it means that steam which is a readily available and relatively inexpensive source of power can be used as the moving gaseous medium. Secondly, since the beet pieces are heated but slightly it means that little of the steam is condensed and as a result the juice eventually obtained is high in solids content. In producing beet sugar it is naturally desirable to recover the beet juice with as high a solids content as possible so that there will be less water to evaporate to produce dry sugar.

In order to accomplish disintegration of the beets, the stream of rapidly moving beet pieces is caused to impinge on a barrier surface. The barrier used may take various forms. For example one may use a sheet of screening, a sheet of perforated metal, a grid of metal bars, or a sheet of metal which is ribbed, scored, knurled, grooved, or otherwise roughened to present protuberant elements to the approaching beet pieces. Generally a perforated barrier is preferred as it is virtually self-cleaning. That is, the beet pulp will mostly go through the barrier and only a minor part will adhere thereto.

For best results, it is preferred that some means be provided to continuously scour the barrier surface to remove particles of pulp clinging thereto. By scouring, one is assured that the beet pieces will strike the bare surface of the barrier and there will be no cushioning effect caused by the pieces striking deposits of pulp on the barrier. Such cushioning will naturally decrease the effectiveness of disintegration. Various alternatives may be applied to achieve a scouring effect. For example the barrier may be rotated at a rate fast enough to throw off clinging pulp by centrifugal action. Where a rotating barrier is used the portion of the barrier not subjected to impingement of the beet pieces at any given moment may be subjected to scrapers, steam or air blasts, or brushes to remove adherent pulp. Instead of rotation, the barrier may be subjected to periodic vibration to remove deposited pulp. Where the barrier is made of perforated material it is possible to use two or more barriers placed so that any beet pieces not disintegrated by the first barrier will strike the second barrier and be disintegrated. As many barriers may thus be used applied in series to the stream of beet pieces as necessary to achieve maximum disintegration. Another advantage of the use of several barriers in series is that the energy of the fast-moving stream of beets may be spread over several barriers with the result that the danger of localized erosive damage to the barrier will be lessened. For example the barrier which first contacts the stream may have large openings so that only a part of the stream will contact the solid portions of the barrier. The second barrier then will receive the impact from the remaining part of the stream.

Where steam is used as the propulsive medium for accelerating the beet pieces, it is preferred to separate the steam from the pulp simultaneously with the formation of the pulp to avoid dilution of the pulp with condensed steam and to avoid excessive heating of the pulp. Apparatus for accomplishing such separation is described below. The so-obtained pulp is then treated to separate the juice from the solid components of the pulp. This may be accomplished in many ways as for example by centrifugation, filtration, pressing, or leaching with water. A convenient technique is to centrifuge or filter the pulp until no more juices exudes therefrom, then wash the cake on the centrifuge or filter by spraying warm water on the cake while it continues to be rotated. In the alternative the cake may be removed, repulped with water or juice and the material centrifuged or filtered again. This procedure may be repeated as often as required to remove all the sugar from the cellular debris.

Reference is now made to the attached drawing which illustrates apparatus for carrying out the preferred modification of this invention. The construction and operation of the apparatus are described as follows:

Referring now in particular to Fig. 1, feeder 1 is a cylindrical vessel provided with a conical bottom. Raw sugar beet cossettes are introduced into feeder 1 directly from the beet cutters.

Centrally disposed within feeder 1 is a vertical shaft 2 bearing paddles 3. Shaft 2 is slowly reciprocated vertically by suitable mechanical device (not illustrated) to cause continuous agitation of the beet pieces so they will not stick together. If desired, shaft 2 may be caused to both rotate and reciprocate through the use of a sliding shaft and cam or other mechanical arrangement. In addition to the paddles, or in place thereof, one may introduce a tangential stream of air into feeder 1 to cause agitation of the beet pieces.

From the bottom of feeder 1, the cossettes are fed by impeller 4, which also acts as an air-lock, into pipe 5. The impeller 4 which is rotated by a suitable device such as a variable-speed electric motor (not illustrated) delivers the cossettes into pipe 5 at a predetermined, measured rate. To assist in the flow of the cossettes, air or steam is introduced at relatively low pressure on the order of 0.5 p. s. i. g. or less into the lower part of the impeller casing through port 6 which is connected by a suitable conduit (not illustrated) to a source of low-pressure air or steam.

The cossettes flow through pipe 5 into inlet chamber 7 of ejector 8. Simultaneously, steam, air, or other gaseous medium at high pressure is introduced into the ejector via nozzle 9. The high pressure stream of steam issuing from nozzle 9 creates a zone of negative pressure in chamber 7 whereby the cossettes are sucked into the stream and propelled through constricted throat 10 into pipe 11. This pipe is sufficiently long, on the order of several feet, to allow the particles of beets to be accelerated to high velocity.

During traverse of the cossettes through pipe 11 little heating of the cossettes occurs. This is primarily due to the very brief period during which the cossettes remain in the pipe. It is also to be noted that because of the jet action wherein the pressure of the steam is converted into kinetic energy there is a very slight pressure at the entrance to pipe 11 on the order of 3 to 6 p. s. i. g. Thus in this preferred modification of our invention, pressure change does not contribute to the disintegration of the beets. There is no explosive effect as with the process of our prior Patent No. 2,807,560.

In order to rupture the cells of the beets it is necessary to suddenly change the momentum of the fast-moving beets. This can be done for example by allowing the stream of beets to impinge on a barrier surface.

In Figs. 2 and 3 is shown apparatus for accomplishing a sudden change in momentum of the rapidly moving stream of cut beets and simultaneous separation of steam from the pulp.

The disintegrator and separator apparatus, or pulping device, depicted in Figs. 2 and 3 includes a cylindrical casing 20 having a first end wall 21, a second end wall 22, and a peripheral wall 23 connecting the said end walls.

An inlet pipe 11 is provided for directing into casing 20 a high-velocity stream of sugar beet pieces suspended in a gaseous medium. Inlet pipe 11 is parallel to, but spaced from, the axis of the casing 20 and extends through first wall 21.

A vent 25, coaxial with casing 20, is provided for discharging gas from the casing and extends through second end wall 22.

Also provided are a first tangential outlet 26 in peripheral wall 23, adjacent to first end wall 21, for discharging from casing 20 a first fraction of beet pulp and a second tangential outlet 27 in the peripheral wall 23, adjacent to second end wall 22, for discharging from casing 20 a second fraction of beet pulp.

Within casing 20 is perforated discoid barrier, or screen 28, rotatable about an axis coaxial with casing 20. The surface of barrier 28 extends in a plane normal to the axis of casing 20 and is of such diameter that the stream of material entering into casing through inlet pipe 11 impinges on the barrier.

Shaft 29 protruding through end wall 21 carries spider 30 to which is attached barrier 28 and blades 31 and blades 32. Shaft 29 is rotated in the direction shown by a suitable motor or the like (not illustrated). Blades 31 are connected to the upstream side of barrier 28; blades 32 are connected to the downstream side of the barrier.

In operation, the high-velocity stream of beets and steam entering casing 20 via pipe 11 impinges against barrier 28. This impingement causes disintegration of the beet pieces to form a pulp. Shaft 29 is rotated at such a speed that beet material does not collect on barrier 28 but is thrown off by centrifugal force. Blades 31 and 32 which rotate with the shaft and barrier force the pulp out of the casing into discharge pipes 33 and 34; steam which is separated from the beets is vented through vent 25.

Referring to Fig. 3, it can be seen that the pulp which passes through barrier 28, that is, to the downstream side of the barrier, is impelled by blades 32 into outlet 27 and discharge pipe 34 whereas the coarser pulp which rebounds from the upstream side of barrier 28 is impelled by blades 31 into outlet 26 and discharge pipe 33. A vertical partition 35 located in the plane of barrier 28 in the throat of casing 20 serves to direct the impelled material into the respective pipes 33 and 34. The coarser pulp leaving the system via pipe 33 may, if necessary, be again passed through the disintegrator.

To ensure positive separation of steam from the pulp, valves 36 and 37 may be adjusted to provide a small back-pressure to force the separated steam out of vent 25.

Since the function of blades 31, 32 is to impel the pulp out of casing 20 into discharge pipes 33, 34, it is evident that the blades should be constructed so as to provide but a small clearance between the edges of the blades and the inner surfaces of end walls 21, 22 and peripheral wall 23.

Having thus described the invention, what is claimed is:

A device for pulping sugar beets comprising a cylindrical casing having a first end wall, a second end wall, and a peripheral wall connecting said end walls; an inlet conduit for directing into the casing a high-velocity stream of sugar beet pieces suspended in a gaseous medium, said inlet conduit being parallel to, but spaced from, the axis of said casing and extending through said first wall; a vent coaxial with the casing for discharging gas from said casing and extending through said second end wall; a first tangential oulet in the peripheral wall of the casing, adjacent to said first end wall, for discharging from the casing a first fraction of beet pulp; a second tangential outlet in the peripheral wall of the casing, adjacent to said second end wall, for discharging from the casing a second fraction of beet pulp; a perforated discoid barrier within the casing and rotatable about an axis coaxial with the casing, the surface of said barrier extending in a plane normal to the axis of the casing, said barrier being of such diameter that the stream of material entering into the casing through said inlet conduit impinges on the barrier; means for rotating said barrier to throw off beet material by contrifugal action; blades connected to the upstream side of said barrier for impelling into said first outlet the beet pulp which remains on the upstream side of the barrier; and blades connected to the downstream side of said barrier for impelling into the said second outlet the beet pulp which passes through the barrier.

References Cited in the file of this patent

UNITED STATES PATENTS

| | | |
|---|---|---|
| 1,756,254 | Lykken | Apr. 29, 1930 |
| 2,117,845 | Hammack | May 17, 1938 |
| 2,293,590 | Chance | Aug. 18, 1942 |
| 2,315,083 | Chesler | Mar. 30, 1943 |
| 2,484,255 | Thomas | Oct. 11, 1949 |